(12) United States Patent
Belinski-Wolfe et al.

(10) Patent No.: US 7,452,483 B2
(45) Date of Patent: Nov. 18, 2008

(54) YELLOW-EMITTING PHOSPHOR BLEND FOR ELECTROLUMINESCENT LAMPS

(75) Inventors: Judy A. Belinski-Wolfe, Towanda, PA (US); Chung Nin Chau, Athens, PA (US); Thomas A. Wolfe, Towanda, PA (US)

(73) Assignee: Global Tungsten & Powders Corp., Towanda, PA (US)

( * ) Notice: Subject to any disclaimer, the term of this patent is extended or adjusted under 35 U.S.C. 154(b) by 287 days.

(21) Appl. No.: 11/462,053

(22) Filed: Aug. 3, 2006

(65) Prior Publication Data

US 2006/0261310 A1   Nov. 23, 2006

Related U.S. Application Data

(63) Continuation-in-part of application No. 11/164,153, filed on Nov. 11, 2005, which is a continuation-in-part of application No. 10/711,682, filed on Sep. 30, 2004.

(51) Int. Cl.
*C09K 11/08* (2006.01)
*C09K 11/59* (2006.01)
*C09K 11/55* (2006.01)
*C09K 11/54* (2006.01)

(52) U.S. Cl. .................. 252/301.4 S; 252/301.4 R; 252/301.4 P; 252/301.4 F; 252/301.4 H; 252/301.5; 252/301.6 R; 252/301.6 S; 252/301.6 F; 252/301.6 P

(58) Field of Classification Search  252/301.4 R–301.6 P; 313/503
See application file for complete search history.

(56) References Cited

U.S. PATENT DOCUMENTS

| | | | |
|---|---|---|---|
| 5,009,808 A | 4/1991 | Reilly et al. | 252/301.6 |
| 5,156,885 A | 10/1992 | Budd | 427/70 |
| 5,220,243 A | 6/1993 | Klinedinst et al. | 313/502 |
| 5,244,750 A | 9/1993 | Reilly et al. | 428/690 |
| 5,643,496 A | 7/1997 | Brese et al. | 353/301.65 |
| 5,702,643 A | 12/1997 | Reddy et al. | 252/301.65 |
| 6,064,150 A | 5/2000 | Klinedinst et al. | 313/503 |
| 6,090,311 A | 7/2000 | Brese et al. | 252/301.65 |
| 6,309,700 B1 | 10/2001 | Fan et al. | 427/213 |
| 6,649,946 B2 | 11/2003 | Bogner et al. | 257/233 |
| 6,682,663 B2 | 1/2004 | Botty et al. | 252/301.4 R |
| 2004/0135504 A1 | 7/2004 | Tamaki et al. | 313/512 |
| 2005/0156496 A1 | 7/2005 | Takashima et al. | 313/237 |
| 2006/0066209 A1 | 3/2006 | Chau | |
| 2006/0066221 A1 | 3/2006 | Belinski-Wolfe et al. | |

FOREIGN PATENT DOCUMENTS

| | | | |
|---|---|---|---|
| CN | 1340590 | | 3/2002 |
| EP | 1001660 | * | 5/2000 |
| EP | 1605028 | | 12/2005 |
| WO | WO 02/11173 | | 2/2002 |
| WO | WO2004/081140 | | 9/2004 |

OTHER PUBLICATIONS

WO 03/080764 A1, front page only (Oct. 2, 2003).

* cited by examiner

*Primary Examiner*—C. Melissa Koslow
(74) *Attorney, Agent, or Firm*—Ballard Spahr Andrews & Ingersoll, LLP

(57) ABSTRACT

A phosphor blend for an electroluminescent lamp is described that comprises a green-emitting electroluminescent phosphor and a red-emitting photoluminescent phosphor, the blend exhibiting an x color coordinate from 0.220 to 0.350 and a y color coordinate from 0.450 to 0.475 when stimulated by an electric field.

8 Claims, 2 Drawing Sheets

YELLOW-EMITTING PHOSPHOR BLEND FOR ELECTROLUMINESCENT LAMPS

CROSS REFERENCE TO RELATED APPLICATIONS

This application is a continuation-in-part of copending application Ser. No. 11/164,153, filed Nov. 11, 2005, which is a continuation-in-part of application Ser. No. 10/711,682, filed Sep. 30, 2004, both of which are hereby incorporated by reference.

BACKGROUND OF THE INVENTION

Electroluminescence is the emission of light under electric-field excitation. Based on this mechanism, electroluminescent (EL) lamps are finding an increasing number of applications in the field of flat panel displays due to the growing demand for consumer electronic products, e.g., cellular phones and portable computing devices. EL lamps also provide uniform light emission independent of viewing angle and they are insensitive to mechanical shock and vibration. They can be easily DC-driven at 1.5-9 volts by using inverters that generate AC voltages of about 100-300 V (peak-to-peak) at frequencies of 50 to 1000 Hz.

The two major EL lamp constructions are generally referred to as thin film and thick film. Thin-film EL lamps are made by depositing alternating thin layers of dielectric materials, phosphors and conductive oxides on a glass substrate using a vapor deposition technique such as CVD. Thick-film lamps are made by suspending powdered materials in resinous materials and then applying the materials in layers onto a plastic film using conventional screen printing techniques. Hence, the thick-film EL lamps can be thin, flexible and rugged thereby making them suitable for a wider range of lighting applications.

The phosphors available for thick-film EL lamps are primarily comprised of zinc sulfide that has been doped with various activators, e.g., Cu, Au, Ag, Mn, Br, I, and Cl. Examples of these phosphors are described in U.S. Pat. Nos. 5,009,808, 5,702,643, 6,090,311, and 5,643,496. Examples of commercial EL phosphors include: OSRAM SYLVANIA Type 813, a blue-emitting ZnS:Cu phosphor, OSRAM SYLVANIA Type 723, a blue-green emitting ZnS:Cu,Cl phosphor and OSRAM SYLVANIA Type 523, a yellow-orange emitting ZnS:Cu,Mn phosphor. Typically, the individual particles of the EL phosphors are encapsulated with an inorganic coating in order improve their resistance to moisture-induced degradation. Examples of such coatings are described in U.S. Pat. Nos. 5,220,243, 5,244,750, 6,309,700, and 6,064,150.

The brightest of the phosphors for thick-film EL lamps emit primarily in the blue to green spectral region at wavelengths from about 400 nm to about 550 nm. Because of this, the color palette available to manufacturers of EL lamps is relatively limited. EL phosphors have been combined with photoluminescent phosphors in order to produce a white light. Unlike EL phosphors, the photoluminescent phosphors are not stimulated by the electric field in an EL lamp. Instead, the photoluminescent phosphors are excited by the light emitted by the EL phosphor. These phosphors produce a visible light emission which when combined with the remaining emission from the EL phosphor makes a white light.

For example, Chinese Patent Publication No. CN 1340590A describes mixing blue- and blue-green emitting EL phosphors with a cerium-activated yttrium aluminum garnet phosphor $Y_3Al_5O_{12}$:Ce, (YAG:Ce). The YAG:Ce phosphor is a photoluminescent phosphor that is excited by wavelengths emitted by the blue and blue-green EL phosphors. The yellow emission from the YAG:Ce phosphor together with the blue- or blue-green emission from the EL phosphor creates a white light. Other examples include U.S. patent application Ser. No. 11/164,153 which describes a white-emitting electroluminescent lamp that uses a phosphor blend comprising a blue- or blue-green emitting electroluminescent phosphor and an europium-activated alkaline earth phosphor having the general formula $Sr_{1-x}Ca_xS$:Eu where $0 \leq x \leq 1$, and U.S. patent application Ser. No. 10/711,682 which describes a high CRI electroluminescent lamp produced by combining a blue- or blue-green emitting EL phosphor with an europium-activated alkaline earth silicon nitride phosphor.

SUMMARY OF THE INVENTION

The present invention expands the color palette available to EL lamp manufacturers by providing a yellow-emitting phosphor blend for EL lamps. Preferably, the blend exhibits an x color coordinate from 0.220 to 0.350 and a y color coordinate from 0.450 to 0.475 when stimulated by an electric field. More particularly, it has been found that a green emission from an EL phosphor may be used to excite various red-emitting photoluminescent phosphors. By blending the phosphors and incorporating them into an EL lamp, the combined emission of the photoluminescent phosphor and the green-emitting EL phosphor produces a yellow light.

Preferably, the green-emitting EL phosphor is a copper-activated zinc sulfide (ZnS:Cu,Cl) phosphor that emits between 470 nm to 550 nm. Preferred photoluminescent phosphors are $Sr_{1-x}Ca_xS$:Eu where $0 \leq x \leq 1$ (herein referred to as (Sr,Ca)S:Eu) and $(M_{1-x}M'_x)Si_5N_8$:Eu where M and M' are at least one of Ca, Sr, and Ba and $0 \leq x \leq 1$. Preferably, the phosphors have a red emission having an x color coordinate from 0.570 to 0.695 and a y color coordinate from 0.325 to 0.430.

Preferably, the green-emitting EL phosphor comprises from 85 to 96 weight percent of the blend and the photoluminescent phosphor comprises from 4 to 15 weight percent of the blend. In a more preferred embodiment, the blend exhibits an x color coordinate from 0.235 to 0.335 and a y color coordinate from 0.460 to 0.465 when stimulated by an electric field.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
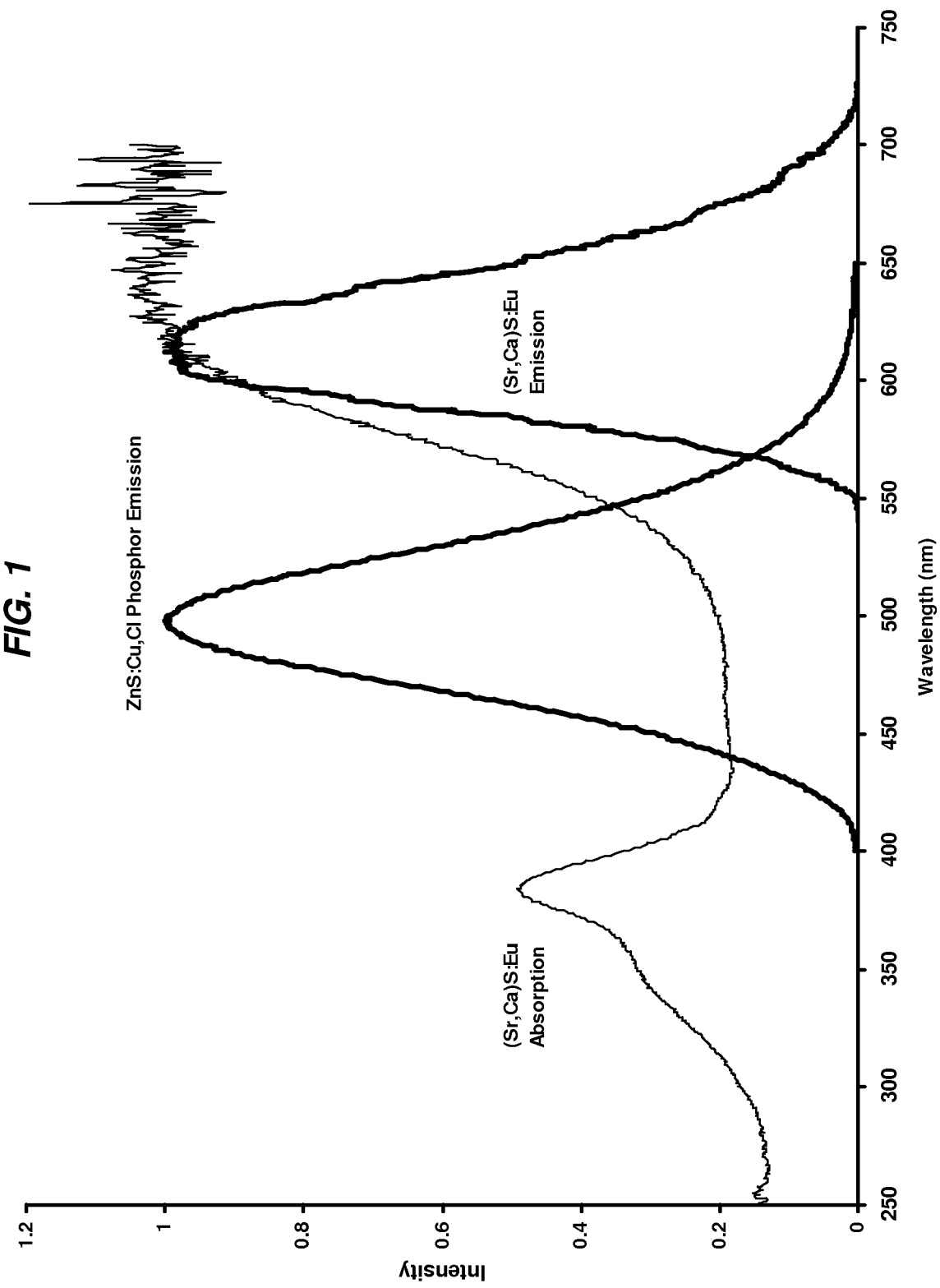
FIG. 1 shows absorption spectrum of a (Sr,Ca)S:Eu phosphor overlaid on the emission spectra of the (Sr,Ca)S:Eu and ZnS:Cu,Cl phosphors.
Figure 2:
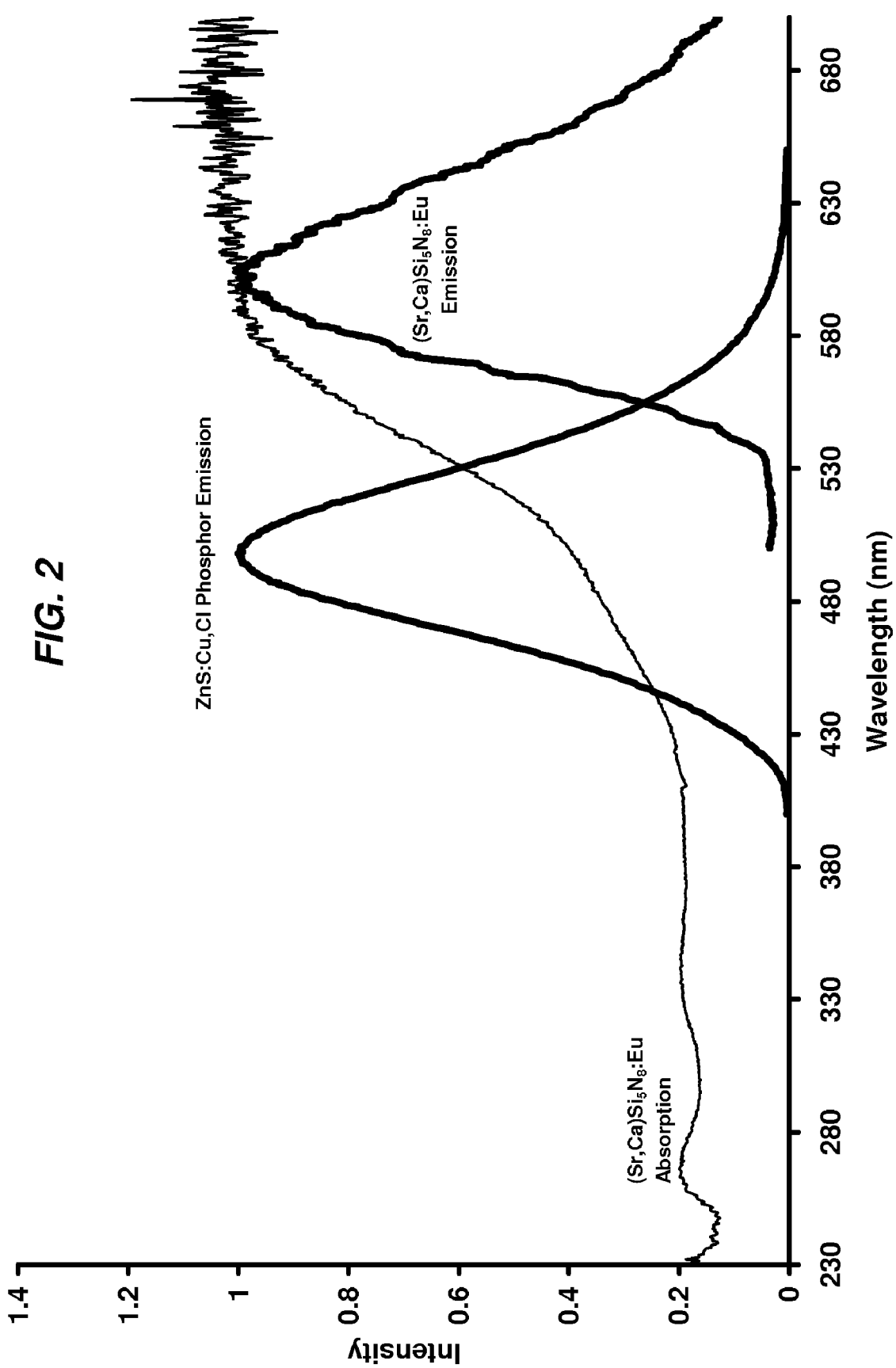
FIG. 2 shows absorption spectrum of a $(Sr,Ca)Si_5N_8$:Eu phosphor overlaid on the emission spectra of the $(Sr,Ca)Si_5N_8$:Eu and ZnS:Cu,Cl phosphors.

The emission of a conventional green-emitting ZnS:Cu,Cl electroluminescent phosphor (e.g., OSRAM SYLVANIA Type 728) is shown in FIGS. 1 and 2. When stimulated in an electric field, the phosphor exhibits a peak emission at about 500 nm. In FIG. 1, this emission is compared to the absorption and emission curves of a (Sr,Ca)S:Eu phosphor. The overlaid curves show that the green emission of the EL phosphor is in a region of relatively strong absorption for the (Sr,Ca)S:Eu phosphor. Thus, the (Sr,Ca)S:Eu phosphor is capable of absorbing a portion of the green emission and converting it to a red emission which peaks at about 615 nm. The remainder of the green emission will combine with the red emission to produce an overall yellow emission when the phosphors are blended in the correct proportions.

Similarly, in FIG. 2, the green emission of the ZnS:Cu,Cl phosphor is overlaid on the absorption and emission curves of a (Sr,Ca)$Si_5N_8$:Eu phosphor. Again, the green emission of the EL phosphor falls in a region of relatively strong absorption for the (Sr,Ca)$Si_5N_8$:Eu phosphor which exhibits a peak emission at about 600 nm. Thus, a yellow emission may be obtained from these phosphors when they are blended in the correct proportions.

EXAMPLES

A green-emitting ZnS:Cu,Cl phosphor (OSRAM SYLVANIA Type 728) and a red-emitting (Sr,Ca)S:Eu phosphor where coated with a hydrolzyed trimethylaluminum (TMA) coating in accordance with U.S. Pat. No. 5,220,243. Several blends of these phosphors were prepared by adding various amounts of the phosphors to a plastic bottle and blending on a paint shaker for twenty minutes. The amount of the coated (Sr,Ca)S:Eu phosphor varied from 4 to 15% by weight. The remainder of the blend consisted of the coated green-emitting EL phosphor. Test lamps having a conventional thick-film construction were made with the phosphor blends and operated at 100V, 400 Hz. The results of the lamp tests are given in the Table. The x,y color coordinates referred to herein are for the 1931 Commission Internationale de l'Eclairage (CIE) Standard Observer (2°).

|  | wt. % (Sr, Ca)S:Eu | 24 hr brightness (cd/m$^2$) | 100 hr brightness (cd/m$^2$) | x color coordinate | y color coordinate |
| --- | --- | --- | --- | --- | --- |
| Sample 1 | 4 | 80.8 | 73.3 | 0.235 | 0.461 |
| Sample 2 | 5 | 80.5 | 73.3 | 0.249 | 0.463 |
| Sample 3 | 6 | 76.4 | 69.5 | 0.259 | 0.464 |
| Sample 4 | 7 | 77.1 | 70.1 | 0.268 | 0.463 |
| Sample 5 | 8 | 74.1 | 67.4 | 0.277 | 0.463 |
| Sample 6 | 9 | 71.4 | 64.9 | 0.284 | 0.462 |
| Sample 7 | 10 | 70.1 | 63.6 | 0.292 | 0.463 |
| Sample 8 | 11 | 67.5 | 61.2 | 0.306 | 0.462 |
| Sample 9 | 13 | 64.2 | 58.2 | 0.320 | 0.460 |
| Sample 10 | 15 | 60.9 | 55.2 | 0.333 | 0.459 |

While there have been shown and described what are present considered to be the preferred embodiments of the invention, it will be apparent to those skilled in the art that various changes and modifications can be made herein without departing from the scope of the invention as defined by the appended claims.

We claim:

1. A phosphor blend for an electroluminescent lamp, comprising a green-emitting electroluminescent phosphor and a red-emitting photoluminescent phosphor, the blend exhibiting an x color coordinate from 0.220 to 0.350 and a y color coordinate from 0.450 to 0.475 when stimulated by an electric field.

2. The phosphor blend of claim 1 wherein the blend exhibits an x color coordinate from 0.235 to 0.335 and a y color coordinate from 0.460 to 0.465 when stimulated by an electric field.

3. The phosphor blend of claim 1 wherein the green-emitting electroluminescent phosphor is ZnS:Cu,Cl and the red-emitting photoluminescent phosphor is selected from:

(Sr,Ca)S:Eu; or $(M_{1-x}M'_x)Si_5N_8$:Eu where M and M' are at least one of Ca, Sr, and Ba and $0 \leq x \leq 1$; or a combination thereof.

4. The phosphor blend of claim 1 wherein the green-emitting electroluminescent phosphor emits between 470 nm to 550 nm and the red-emitting photoluminescent phosphor exhibits a red emission having an x color coordinate from 0.570 to 0.695 and a y color coordinate from 0.325 to 0.430 when stimulated by the emission from the green-emitting electroluminescent phosphor.

5. The phosphor blend of claim 1 wherein the green-emitting EL phosphor comprises from 85 to 96 weight percent of the blend and the red-emitting photoluminescent phosphor comprises from 4 to 15 weight percent of the blend.

6. A phosphor blend for an electroluminescent lamp, comprising:

a green-emitting electroluminescent phosphor and a red-emitting photoluminescent phosphor, the blend exhibiting an x color coordinate from 0.220 to 0.350 and a y color coordinate from 0.450 to 0.475 when stimulated by an electric field;

the green-emitting electroluminescent phosphor comprising ZnS:Cu,Cl and the red-emitting photoluminescent phosphor being selected from:

(Sr,Ca)S:Eu; or $(M_{1-x}M'_x)Si_5N_8$:Eu where M and M' are at least one of Ca, Sr, and Ba and $0 \leq x \leq 1$; or a combination thereof; and the green-emitting EL phosphor comprising from 85 to 96 weight percent of the blend and the red-emitting photoluminescent phosphor comprising from 4 to 15 weight percent of the blend.

7. The phosphor blend of claim 6 wherein the blend exhibits an x color coordinate from 0.235 to 0.335 and a y color coordinate from 0.460 to 0.465 when stimulated by an electric field.

8. The phosphor blend of claim 7 wherein the red-emitting photoluminescent phosphor is (Sr,Ca)S:Eu.

* * * * *